United States Patent [19]

La Freniere

[11] 4,389,311

[45] Jun. 21, 1983

[54] PORTABLE WATER PURIFIER

[76] Inventor: Henry La Freniere, 8421 Forest Hills Dr., Coral Springs, Fla. 33065

[21] Appl. No.: 283,992

[22] Filed: Jul. 16, 1981

Related U.S. Application Data

[63] Continuation of Ser. No. 146,310, May 5, 1980, abandoned.

[51] Int. Cl.³ ............................ C02F 1/28; C02F 1/50
[52] U.S. Cl. ............................. 210/198.1; 210/282; 141/98; 206/217; 422/61
[58] Field of Search ............... 210/660, 694, 753, 764, 210/198.1, 232, 238, 282; 206/216, 217, 233, 45.33; 141/325, 326, 327, 286, 98; 422/61, 102

[56] References Cited

U.S. PATENT DOCUMENTS

| | | | |
|---|---|---|---|
| 719,612 | 2/1903 | Russell | 206/217 |
| 2,761,833 | 9/1956 | Ward | 210/282 |
| 2,766,796 | 10/1956 | Tupper | 206/217 |
| 2,892,595 | 6/1959 | Tupper | 206/223 |
| 3,223,619 | 12/1965 | Calmon | 210/764 |
| 3,339,743 | 9/1957 | Bealle | 210/660 |
| 3,408,295 | 10/1968 | Vaichulis | 210/198.1 |
| 3,449,081 | 6/1969 | Hughes | 210/282 |
| 3,638,790 | 2/1972 | Schmid | 206/45.33 |
| 3,712,462 | 1/1973 | Gabor | 206/217 |
| 4,051,977 | 10/1977 | Steinfeld | 206/217 |

FOREIGN PATENT DOCUMENTS

| | | | |
|---|---|---|---|
| 879868 | 8/1971 | Canada | 210/282 |
| 1131309 | 2/1957 | France | 210/282 |
| 603402 | 4/1960 | Italy | 210/282 |

OTHER PUBLICATIONS

The Merck Index, Eighth Edition, 1968, USA, 1026.

*Primary Examiner*—Ernest G. Therkorn

[57] ABSTRACT

A portable water purification kit and filter wherein the filter is comprised of a bed of particulate adsorbent material in a flow through casing provided with end caps, with one of the caps being a flexible cap, which is capable of being deformed for the application of a force to water flowing in the casing to increase the rate of flow through the particulate adsorbent. The filter is included in a portable kit for water purification comprised of a kit package which is a container for water having a removable cover, with the water filter and a tablet package, which includes a plurality of bacterial disinfectant tablets being included within the water container to provide a unified package.

11 Claims, 5 Drawing Figures

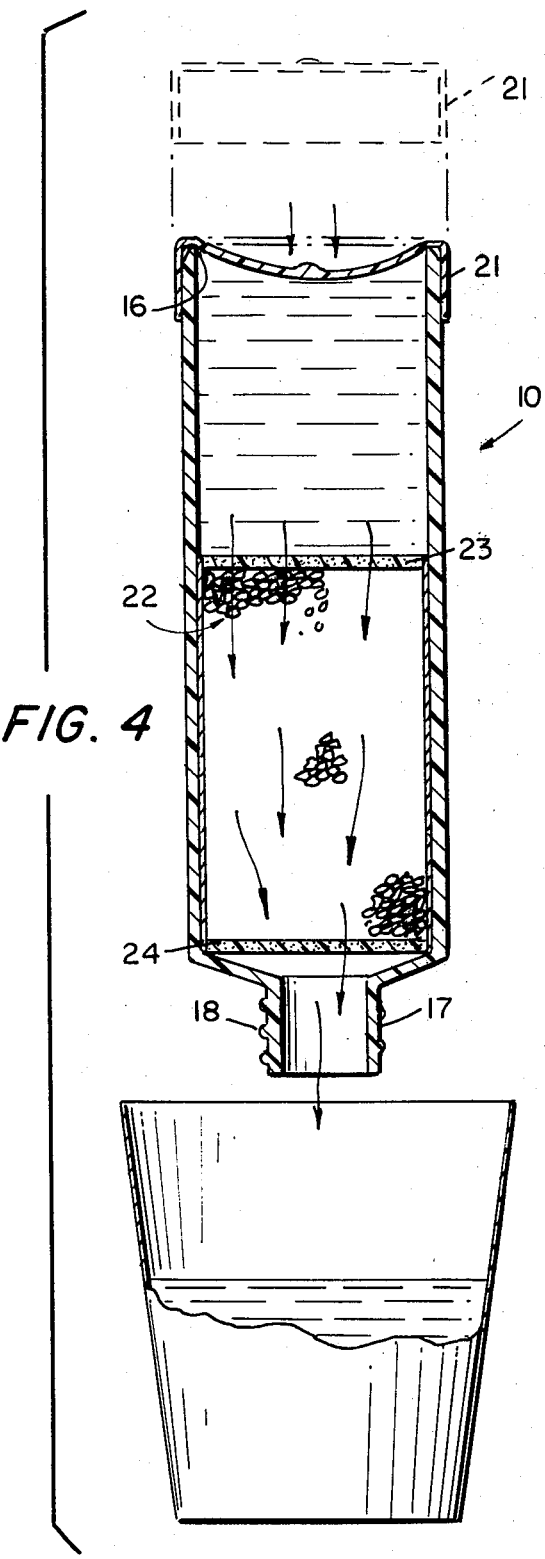
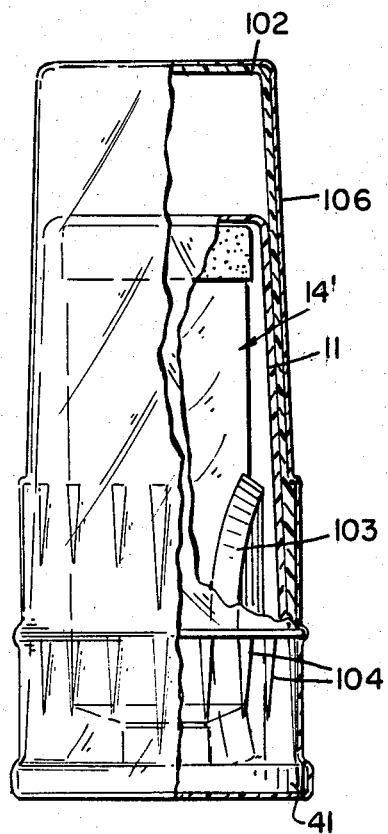
FIG. 4
FIG. 5

PORTABLE WATER PURIFIER

This is a continuation, of application Ser. No. 146,310, filed May 5, 1980, now abandoned.

This invention relates to water purification, and more particularly to an improved product and process for providing safe drinking water.

In many cases, such as when camping, traveling in foreign countries and the like, the water quality which is available may not be completely suitable for drinking. Thus, for example, the water may have a bacterial and/or chemical content and/or odor which derogates from its suitability as drinking water.

In accordance with the present invention there is provided a product and method for purifying water, and in particular for improving the suitability and/or quality of water for the purposes of drinking.

In accordance with one aspect of the present invention, there is provided a portable kit for use in the purification of water comprised of a kit package which includes a water filter and a potable bacterial disinfectant or germicide. More particularly, the kit package is comprised of a water container and a removable cap therefor. Within the container, there is provided (1) a disinfectant or germicide package which includes a bacterial disinfectant or germicide (one which is capable of being ingested by humans) and (2) a water filter. The water filter is comprised of a filter casing, which includes a bed formed from a particulate adsorbent for adsorbing impurities from water.

In accordance with another aspect of the present invention, there is provided a water filter comprised of a casing having first and second open ends, a bed comprised of a particulate adsorbent for adsorbing impurities from the water, which is within the casing, and first and second removable caps for closing the first and second open ends of the casing, with one of the first and second caps being a flexible cap which is capable of being deformed to apply a force to water in the casing to increase the rate of water flow through the bed of particulate adsorbent material.

In accordance with another aspect of the present invention, there is provided a method for purifying water by use of the kit of the present invention.

The present invention will be further described with respect to the accompanying drawings, which illustrate preferred embodiments of the invention, wherein:

FIG. 4 is an exploded sectional view illustrating use of the kit of FIG. 2; and

FIG. 5 is a view, partially in section, of a further embodiment of the kit of the present invention.

Figure 1:
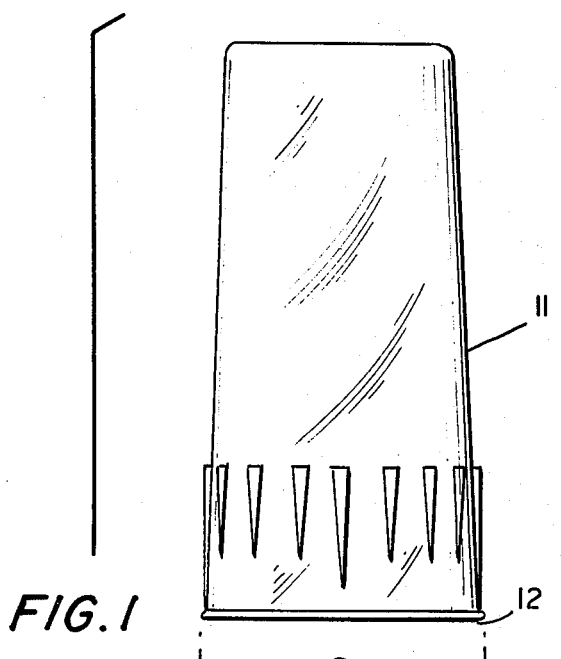
FIG. 1 is an exploded view of an embodiment of the portable kit of the present invention.

It is to be understood, however, that the present invention is not to be limited to the preferred embodiments illustrated in the drawings.

Referring now to FIGS. 1 through 4 of the drawings, there is shown, a portable water purification kit, schematically generally indicated as 10. The kit is comprised of a kit package, in the form of a water container 11 having an open top which is closed by a removable cover 12.

Figure 3:
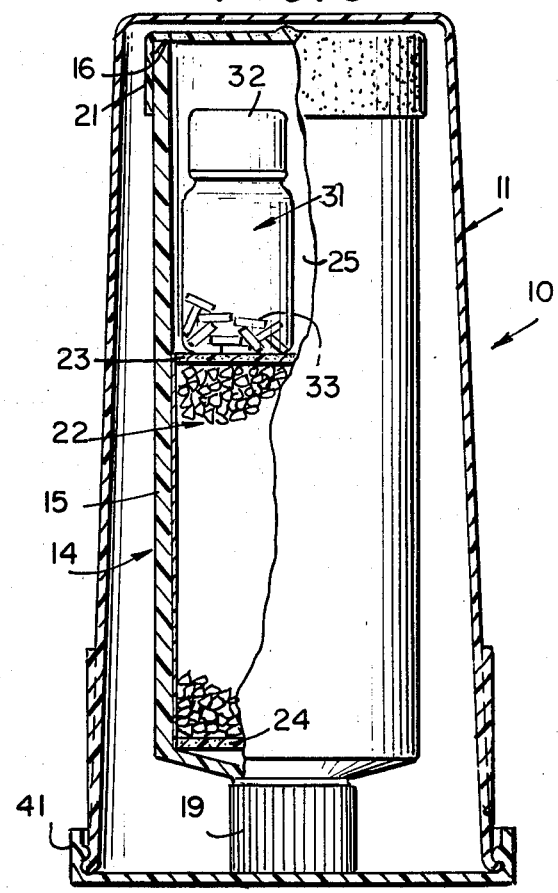
FIG. 3 is a sectional view of the kit shown in FIG. 2.

A water filter, generally indicated as 14 is enclosed within the container 11, with the filter 14 being removable therefrom. The filter 14, as shown in FIGS. 3 and 4 is comprised of a flow through filter casing 15, formed of a rigid material, such as a suitable plastic (for example, rigid polyvinylchloride), with the casing 15 having a generally cylindrical shape. The casing 15 has an enlarged open end 16, and at the opposite end terminates in an open neck portion 17, with the neck portion 17 including suitable external threads 18 for receiving a removable screw type cap 19 for opening and closing the open end 17. The open end 16 of casing 15 is provided with a removable closure means or cap 21 which is formed of a resilient flexible material, such as flexible polyvinyl chloride with the cap 21 being applied over the open end 16 of casing 15. The cap 21 is applied to the open end 16 of casing 15 by stretching the cap so that the interior surface thereof slides over the exterior surface of casing 15. The function and purpose of cap or closure 21 will be hereinafter described in more detail.

The interior of casing 15 is provided with a bed 22 formed of a particulate adsorbent for adsorbing impurities from water. As particularly shown, the bed 22 is supported between permeable retaining members 23 and 24, with such retaining members 23 and 24 being comprised of a material through which water can flow, and which is capable of retaining the particulate adsorbent therebetween. As particularly shown the retaining members 23 and 24 are comprised of disc members and the member 23 closest to the inlet end also functions to prevent any large particles present in the water from being introduced into the adsorbent bed.

The particulate adsorbent may be any one of a wide variety of materials which are known to be suitable for adsorbing impurities from water. Thus, for example, the adsorbent could be activated carbon, a zeolite or the like. A preferred adsorbent is activated carbon which is capable of adsorbing a wide variety of chemical impurities, which may be found in water. A preferred activated carbon for use in the filter is sold under the mark NORIT. The bed of particulate material is provided so as to effect purification by adsorption, while providing also for suitable flow therethrough.

As shown, the bed 22 occupies only a portion of the casing and thereby casing includes an open space 25, which functions as an inlet space or reservoir for water introduction.

The kit further includes a disinfectant or germicide package or container, which as particularly shown is in the form of a small vial or bottle 31, having a screw cap 32. The bottle 31 includes a germicide or disinfectant for killing bacteria and viruses present in water, which as particularly shown is in the form of tablets 33. The disinfectant or germicide may be any one of a wide variety of chemicals which are known to be suitable for the purpose of addition to water to be consumed by humans for drinking purposes and which tablets are known to kill bacteria or viruses which may be present in such water. As representative examples of such disinfectants, there may be mentioned silver nitrate, tetraglycine hydroperiodide, hypochlorous acid. A preferred disinfectant or germicide is tetraglycine hydroperiodide. The tablet is preferably provided in a unit dosage form; i.e., the tablet includes sufficient germicide for use in purifying a liter or quart of water. Such germicides or disenfectants for water purification are known in the art, and no further details in this respect are deemed necessary for a complete understanding of the invention.

As particularly shown, the germicide package 31 is stored within the open space 25 of filter 14; however, it is to be understood that the disinfectant may be placed directly within the container 11.

Figure 2:
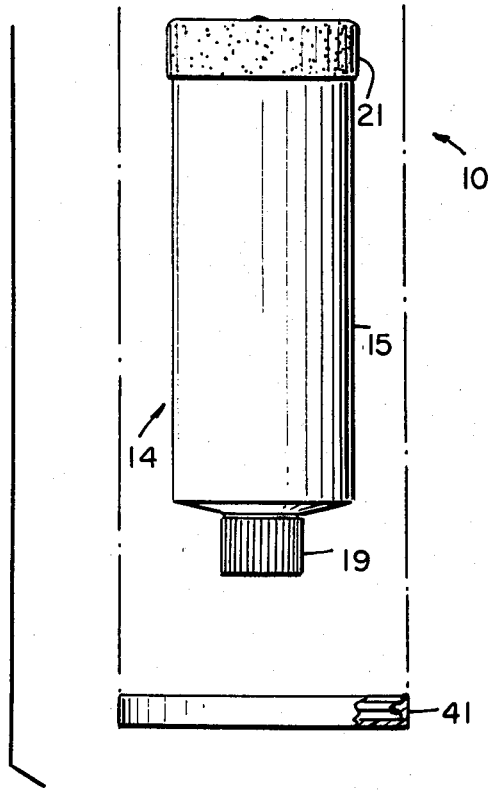
FIG. 2 is a view of the kit embodiment of FIG. 1 in package form.
Figure 2:
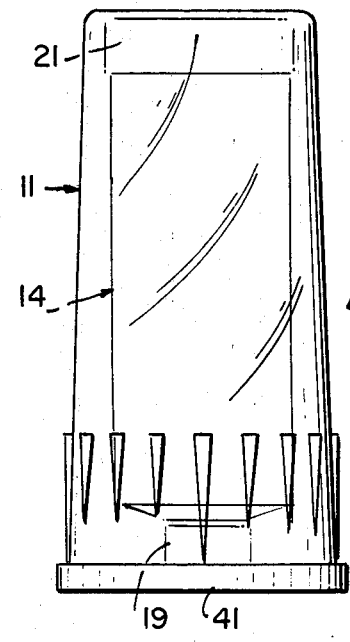

As shown in FIGS. 1, 2 and 3, there is provided a portable water purification kit in package form, with a water receiving container 11, which is provided with an appropriate removable cap 41 which snaps over the open end of container 11 providing the package exterior. Within the container 11, there is provided a water filter and a water disinfectant package, whereby there is provided in a single package components which are suitable for providing safe and agreeable drinking water, without boiling and without installation. The exterior of container 11 may be provided with a suitable film wrap; however, such film wrap is not necessary. As should be apparent, after use of the water purification kit, as hereinafter described, the components thereof may be replaced and maintained in a convenient and suitable packaged form. In addition, by providing a kit which includes both an adsorbent filter and a water germicide or disinfectant, the kit is capable of purifying drinking water against all types of water borne bacteria and viruses including amoebic dysentery (Montezuma's Revenge), cholera, typhoid, hepatitis, salmonella, etc. and is also effective for removing various chemicals such as copper, cobalt, lead, mercury, chloroform, phenol, carbon tetrachloride, DDT, insecticides, aluminum, chromium, manganese, pesticides and various other impurities and materials which cause unpleasant tastes and odors.

In operation, the package is opened by removing cap 41 from container 11, followed by removing filter 14 from the container 11. Caps 21 and 19 are removed from the filter, and the disinfectant package 32 is removed from the open space 25 of filter casing 15. A germicide tablet 33 is removed from package 31 and added to water to be purified, such as a quart of water. The germicide tablet is allowed to act for a period in the order of about 3 minutes followed by agitation and waiting an additional 10 minutes for the tablet to complete the disinfecting process. Subsequently, as shown in FIG. 4, the water is then poured into the enlarged open end of filter 14 and caused to flow through the bed of adsorbent material 22 through the neck portion 17 into the container 11 to thereby provide purified drinking water. In some cases, there may be a hold up of flow through the particulate bed 22, and in such cases, as shown in FIG. 4, cap 21 is applied to the open end of the filter casing 15 with water therein, and such cap is depressed to exert a pushing force on the water within the casing to thereby increase the rate of flow through the particulate material. Thus, the cap 21 exerts a plunger type of action to increase the flow rate through the particulate bed 22.

After completing the filtration operation, the filter caps 19 and 21 should be replaced, prior to storing of the filter within the container package 11.

In accordance with a further embodiment of the invention, as illustrated in FIG. 5, which is similar to the embodiment of FIGS. 1 to 4, except that the kit package is provided with an additional container, whereby there is provided an integrated package having a container suitable for holding the water to be purified during the disinfecting with the germicide tablet, and a further container for receiving the purified water after passage through the filter. As particularly shown, the kit package includes the filter 14', with such filter including within its interior the disinfectant package (not shown). The filter 14' is identical to the one hereinabove described, and as a result no details are required for an understanding of this embodiment.

As particularly shown in FIG. 5, the water container 11 is provided in a nesting relationship within a further water container 102, and the interior of container 11 is further provided with an additional cap 103 for closing the open end of container 102. The exterior of container 111 includes a plurality of ridges 104 which act as stops against the rim of exterior container 102 to maintain the nesting relationship, as shown. The exterior of the nested containers may be provided with a suitable wrap, such as a film, for covering the exterior of the package. Thus, in accordance with the embodiment of FIG. 5, there is provided two water containers, as well as the filter and disinfectant for effecting purification of the water.

Although the invention has been described with respect to preferred embodiments, it is to be understood that the invention is not limited to the embodiments particularly shown. Thus, for example, although the disinfectant tablet package is included within the interior of the filter, such disinfectant package could be included exterior of the filter, and within container 11. Similarly, the disinfectant package may be in a form other than a vial or bottle. As a further alternative, the filter need not be provided with the flexible cap, as particularly shown, although such an embodiment is preferred.

The above modifications and others should be apparent to those skilled in the art from the teachings herein.

The present invention is particularly advantageous in that it provides a portable water purification kit, in package form, which includes those elements necessary for effective purification of drinking water and to make such water palatable to the taste. The kit is simple to use and may be conveniently carried on camping trips and the like. In addition, by providing a unique type of filter, there can be obtained effective purification at acceptable flow rates.

These and other advantages should be apparent to those skilled in the art from the teachings herein.

Numerous modifications and variations of the present invention are possible in light of the above teachings and, therefore, within the scope of the appended claims, the invention may be practised otherwise than as particularly described.

I claim:

1. A packaged kit for use in the purification of water, comprising:

a kit package comprising a container for retaining water and a removable cover closing said container; a water filter in said kit package which is removable therefrom, said water filter comprising a flow through casing having an inlet end and an opposite outlet end to provide for axial flow through the casing, said casing including a bed of particulate adsorbent for adsorbing impurities from the water and first and second permeable supporting members within the casing supporting and confining said bed of particulate adsorbent therebetween over the casing crosssection, said casing including a water reservoir space between the inlet end and supported bed of particulate adsorbent; and a disinfectant package in said kit package which is removable therefrom, said disinfectant package including a disinfectant for water borne bacteria and viruses.

2. The kit of claim 1 wherein said water filter includes first and second removable caps for closing the casing.

3. The kit of claim 2 wherein one of said caps is a flexible cap capable of being deformed to apply a force to water in the casing to increase the rate of water flow through the bed of particulate adsorbent.

4. The kit of claim 2 wherein first and second removable caps close the ends of the casing.

5. The kit of claim 4 wherein the disinfectant package is packaged within the water reservoir space of the casing.

6. The kit of claim 2 wherein the particulate adsorbent is activated carbon.

7. The kit of claim 6 wherein the disinfectant is tetraglycine hydroperiodide.

8. The kit of claim 7 wherein one of said caps is a flexible cap capable of being deformed to apply a force to water in the casing to increase the rate of water flow through the bed of particulate adsorbent.

9. The kit of claim 1 wherein the kit package is further comprised of another water container nested over said water container and a wrap covering said water container and said another water container.

10. The kit of claim 9 wherein the kit package further includes another removable cover for covering said another water container.

11. The kit of claim 9 wherein the particulate adsorbent is activated carbon.

* * * * *